Patented Dec. 2, 1930

1,783,366

UNITED STATES PATENT OFFICE

RICHARD W. LEWIS, OF MONTCLAIR, NEW JERSEY

DISPERSION AND METHOD OF MAKING THE SAME

No Drawing. Application filed April 12, 1928. Serial No. 269,612.

My present invention relates to bituminous compositions and methods of making them and to such compositions which are impervious to and unaffected by water after the setting, drying or congealing thereof, and bituminous compositions of my invention being applicable in the arts generally.

More particularly my invention relates to the preparation and use of bitumen-in-water dispersions using as a dispersing agent gelatinous aluminum hydrate mixed with clay.

The object of my invention is, by combining two dispersing agents, each defective in some respects, to produce and utilize a new dispersing agent free from disadvantages obtaining by the use alone of either constituent.

Another object of my invention is to provide a new dispersing agent comprising a mixture of gelatinous aluminum hydrate and clay.

Another object of my invention is to provide an improved bituminous emulsion of bitumen-in-water which is productive, upon drying for any given period of time, of a bituminous composition which is more stable and more resistant to the action of aqueous media than a bituminous composition dried before exposure for the same period of time and produced from a bituminous emulsion prepared by the use of clay alone as a dispersing agent.

Clay alone has the following advantages and disadvantages as a dispersing agent for producing dispersions of bitumen-in-water. It is cheap, readily available in large quantity and is mechanically an excellent dispersing agent; that is, bitumen disperses readily in the presence of clay and dispersions so produced may be stored in merchantable form over considerable periods of time without suffering too severely from sedimentation. However, these clay bitumen dispersions when put into use as protective or bonding materials suffer from the very serious disadvantage that they are readily physically attacked by water, dilute acids and alkalies, salt solutions and other aqueous media, with the result that they are softened, become permeable and fail of their purpose as protective or bonding materials. This inability to resist water results in irreparably impairing both the cohesion and the adhesion of the dried composition. The resulting irreparable injury occurring, upon exposure, to clay-bitumen compositions heretofore known at best can be only partially obviated, the only possible procedure for so doing necessitating a period of preliminary drying so extremely long as to be impracticable.

Gelatinous aluminum hydrate when used alone as a dispersing agent for bitumen-in-water is highly effective as a dispersing agent and the compositions so produced are highly resistant to an action of water or dilute aqueous media. However, dispersions so prepared are apt to be coarse grained and, on long storage in a merchantable condition suffer severely from sedimentation. Moreover, gelatinous aluminum hydrate is relatively a very expensive dispersing agent.

By preparing an intimate mechanical mixture of clay and gelatinous aluminum hydrate in proportions hereinafter set forth a new substance is produced which possesses as a dispersing agent for bitumen-in-water new and valuable properties not heretofore known in the art. The particles of such mixtures behave as a new substance in their action as a dispersing agent and the properties of dispersions prepared with this new substance as a dispersing agent are new and valuable in that such compositions, when dried for a short and practicable period of time before use, have the ability of resisting successfully the action of dilute aqueous media and to preserve under exposure to such media their valuable adhesive and cohesive properties, while at the same time such compositions may be made of desirable grain size; may be stored in merchantable form without suffering excessively from sedimentation; and are relatively cheap.

A preferred bituminous composition which is useful as a waterproofing and protective coating for ordinary commercial purposes may comprise, in accordance with my invention, a mixture of substantially equal parts of gelatinous aluminum hydrate and clay, say 100 pounds of each; the gelatinous aluminum hydrate to be preferably a gelatinous paste which could be computed as composed of approximately 20 per cent $Al_2(OH)_6$ and 80 per cent water, the clay being of such nature as to constitute by itself or after admixture with the gelatinous aluminum hydrate an efficient agent for dispersing asphalt in water.

To the mixture composed of 100 pounds each of gelatinous aluminum hydrate and clay there is added a sufficient quantity of water (say approximately 200 pounds, it being well understood that clays of different character require different quantities of water) to make a thick viscous slip and, while this whole mass is being thoroughly agitated, the bitumen in a fluid state is slowly added.

By interrupting the addition of bitumen at any predetermined point there is obtained a composition which is useful in the arts and which is more useful and of greater efficiency than a corresponding composition containing the same amount of bitumen but obtained by the use as a dispersing agent of clay alone. Hence, from 1 to 20 or more parts of bitumen in a fluid state may be added while the mass is being stirred, the exact amount of bitumen to be added being predetermined by the use to which the material is to be put. More water may be added in such quantity as to obtain the consistency desired.

For obtaining the commercial bituminous composition first referred to, there may be slowly added to the thick viscous slip obtained as hereinbefore set forth and while stirring continues, asphalt in the fluid state, together with approximately 200 pounds of water, until approximately 900 pounds of asphalt have been added. The mixture is then thinned to brushing consistency by adding approximately 500 pounds of water.

Another preferred composition, which is otherwise identical with the one just described, would start with 200 pounds of emulsifying agent composed by weight of two parts of gelatinous aluminum hydrate paste to one part of clay.

The aluminum hydrate paste being a relatively expensive ingredient, naturally no more would be used than was necessary to accomplish the desired commercial purpose, hence I wish it to be understood that it is within the purview of my invention to employ, as may be considered necessary or advisable, one, two, three or more parts of the aluminum hydrate paste per one part of clay, or even to use somewhat less than one part of hydrate; it having been found that the addition of gelatinous aluminum hydrate to clay is highly beneficial within wide limits.

A batch of composition obtained by practicing the invention may be obtained while the ingredients are either cold or hot, depending upon the particular bitumen employed, and either as an individual batch or as a mother batch for a subsequent continuous or intermittent process.

I claim:

1. The method of dispersing bitumen in water, comprising mixing bitumen, aluminum hydroxide paste, clay and the water.

2. The method of dispersing asphalt in water, comprising mixing asphalt, gelatinous aluminum hydrate, clay and the water.

3. The method of dispersing bitumen in water, comprising the step of disintegrating the bitumen by the application of aluminum hydrate paste and clay thereto while mixing with water.

4. The method of dispersing bitumen in water, comprising the step of agitating the bitumen together with water and a dispersing agent comprising a mixture of clay and gelatinous aluminum hydrate.

5. In a dispersion of bitumen-in-water, a dispersing agent comprising clay and gelatinous aluminum hydrate.

6. In a dispersion of bitumen-in-water, a dispersing agent comprising approximately from one to three parts of gelatinous aluminum hydrate mixed with one part by weight of clay.

7. A bituminous emulsion of a bitumen-in-water, comprising water, bitumen and an emulsifying agent therefor comprising a mixture of clay and gelatinous aluminum hydrate.

8. A bituminous emulsion comprising, water, asphalt, and an emulsifying agent therefor comprising from one to three parts of aluminum hydrate paste mixed with one part by weight of clay.

9. The combination with a base, of the composition left after the drying of a bituminous dispersion comprising, bitumen, water, aluminum hydrate, and clay.

10. The combination with a base, of the composition left after the drying of a bituminous dispersion comprising, approximately nine parts of bitumen, one to three parts of aluminum hydrate, one part of clay and sufficient water to compose a continuous external phase surrounding the other constituents.

In testimony whereof I hereto affix my signature.

RICHARD W. LEWIS.